United States Patent
Enami et al.

(10) Patent No.: US 10,322,605 B2
(45) Date of Patent: Jun. 18, 2019

(54) MULTI-PIECE RIM STRUCTURE FOR WHEEL

(71) Applicant: Topy Kogyo Kabushiki Kaisha, Tokyo (JP)

(72) Inventors: Keitaro Enami, Tokyo (JP); Kentaro Oba, Tokyo (JP); Zulkaizam Asri Bin Kassim Mohd, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 89 days.

(21) Appl. No.: 15/524,791

(22) PCT Filed: Dec. 8, 2015

(86) PCT No.: PCT/JP2015/084393
§ 371 (c)(1),
(2) Date: May 5, 2017

(87) PCT Pub. No.: WO2016/098643
PCT Pub. Date: Jun. 23, 2016

(65) Prior Publication Data
US 2017/0326912 A1 Nov. 16, 2017

(30) Foreign Application Priority Data
Dec. 16, 2014 (JP) .................. 2014-253618

(51) Int. Cl.
*B60B 25/02* (2006.01)
*B60B 25/04* (2006.01)
(Continued)

(52) U.S. Cl.
CPC .............. *B60B 25/02* (2013.01); *B60B 25/04* (2013.01); *B60B 2900/141* (2013.01);
(Continued)

(58) Field of Classification Search
CPC ....... B60B 25/02; B60B 25/04; B60B 25/045; B60B 25/14; B60B 25/18
See application file for complete search history.

(56) References Cited

U.S. PATENT DOCUMENTS 4,209,052 A * 6/1980 French .................. B60B 25/18
152/410
5,335,706 A 8/1994 Foster
(Continued)

FOREIGN PATENT DOCUMENTS

JP 2-169302 A 6/1990
JP 07257102 A * 10/1995
(Continued)

OTHER PUBLICATIONS

International Search Report in corresponding International Patent Application No. PCT/JP2015/084393 dated Feb. 2, 2016.
(Continued)

*Primary Examiner* — Kip T Kotter
(74) *Attorney, Agent, or Firm* — Thomas B. Ryan, Patent Agent; Harter Secrest & Emery LLP

(57) ABSTRACT

A multi-piece rim structure for a wheel includes a rim base 10, a bead seat ring 20 (ring member) and a lock ring 30. The bead seat ring 20 receives a load in a radial direction and an axial direction from a bead portion of a tire. An annular ridge 35 of the lock ring 30 can be received in an annular lock ring groove 15 of the rim base 10. A receiving groove 15*a* is formed in an inner surface of the lock ring groove 15 of the rim base 10. A sacrificial anticorrosion material 80 is embedded in the receiving groove 15*a*. The sacrificial anticorrosion material 80 includes metal such as zinc and aluminum that has a greater ionization tendency than iron that is a base material of the rim base 10 and the lock ring 30. Corrosion of the rim base 10 and the lock ring 30 can be suppressed by ionization of the sacrificial anticorrosion material 80.

15 Claims, 7 Drawing Sheets

(51) Int. Cl.
    *C09D 5/08*            (2006.01)
    *C09D 5/10*            (2006.01)
    *C09D 7/61*            (2018.01)

(52) U.S. Cl.
    CPC ............... *C09D 5/084* (2013.01); *C09D 5/10* (2013.01); *C09D 5/103* (2013.01); *C09D 5/106* (2013.01); *C09D 7/61* (2018.01)

(56) References Cited

U.S. PATENT DOCUMENTS

| | | | |
|---|---|---|---|
| 5,476,128 A * | 12/1995 | Jankowski | ............... B60B 25/14 |
| | | | 152/396 |
| 5,947,175 A | 9/1999 | Watanabe et al. | |
| 2015/0217599 A1* | 8/2015 | Zehnder | .................. B60B 25/12 |
| | | | 301/29.2 |

FOREIGN PATENT DOCUMENTS

| | | |
|---|---|---|
| JP | 10-24701 A | 1/1998 |
| JP | 10-175401 A | 6/1998 |
| JP | 2001225604 A | 8/2001 |
| JP | 2013139204 A | 7/2013 |

OTHER PUBLICATIONS

International Preliminary Report on Patentability in corresponding International Patent Application No. PCT/JP2015/084393 dated Jun. 29, 2017.

\* cited by examiner

MULTI-PIECE RIM STRUCTURE FOR WHEEL

FIELD OF THE INVENTION

The present invention relates to a multi-piece rim structure for a wheel such as those disposed in a large vehicle used in mines.

BACKGROUND ART

A rim structure of a wheel for an off-road type large vehicle such as those used in mines is typically composed of multiple pieces to make it easy to mount a large-weight tire.

A known multi-piece rim structure 1 shown in FIG. 6 includes five pieces, i.e., a rim base 10, a bead seat ring 20 (ring member), a lock ring 30 and a pair of side rings 40, 50. "Axial direction", "radial direction" and "circumferential direction" used in this specification respectively refer to an axial direction, a radial direction and a circumferential direction of the multi-piece rim structure. "Outside in the axial direction" refers to a side away from a central position of a tire set in the multi-piece rim structure in the axial direction. "Inside in the axial direction" refers to a side closer to the central position of the tire in the axial direction.

The rim base 10 is made by welding three short cylindrical members one by one arranged in the axial direction (width direction). Each of the short cylindrical members is made by rounding a strip of rolled steel plate into a cylindrical shape and welding opposite end surfaces thereof.

The rim base 10 includes a gutter band portion 11 on one side thereof in the axial direction and a back flange portion 12 on the other side thereof.

The bead seat ring 20 is disposed on an outside of the gutter band portion 11 of the rim base 10 in the radial direction. One of the side rings 40 is disposed on an outside of the bead seat ring 20 in the radial direction. The side ring 40 is caught by an annular raised flange portion 21 formed in a peripheral edge of the bead seat ring 20 located outside in the axial direction. The other side ring 50 is caught by the back flange portion 12 of the rim base 10.

An outer peripheral surface of the bead seat ring 20 is provided as a bead seat portion 22 having a width W. An outer peripheral surface of a portion of the rim base 10 adjacent to the side ring 50 is provided as a bead seat portion 13 having a width W. The bead seat portions 22, 13 are arranged to have a pair of bead portions of a tire (not shown) placed thereon. An annular load applying surface 23 having a tapered configuration is formed in an inner periphery of an edge portion of the bead seat ring 20 located outside in the axial direction.

To mount a tire to the multi-piece rim structure 1 described above, the side ring 50, the tire, the side ring 40 and the bead seat ring 20 are moved in this order in the axial direction from the gutter band portion 11 toward the back flange portion 12 to be mounted on the rim base 10, and finally, the lock ring 30 is received in the rim base 10.

Prior to the mounting of the bead seat ring 20, a seal ring 60 that is an O-ring is fitted into a seal ring groove 16 (to be described later) of the gutter band portion 11. The seal ring 60 is provided for sealing between the bead seat ring 20 and the gutter band portion 11.

A multi-piece rim structure 1' shown in FIG. 7 is also well-known. The multi-piece rim structure 1' includes three pieces, i.e., a rim base 10', a ring member 5 and a lock ring 30. The rim base 10' integrally includes a side ring portion 50'. The side ring portion 50' corresponds to the side ring 50 and the back flange portion 12 of the multi-piece rim structure 1 shown in FIG. 6. The ring member 5 integrally includes a bead seat ring portion 20' and a side ring portion 40'. The bead seat ring portion 20' and the side ring portion 40' respectively correspond to the bead seat ring 20 and the side ring 40 of the multi-piece rim structure 1 shown in FIG. 6. Other features are similar to those shown in FIG. 6, and therefore, are designated by the same reference numerals and description thereof will be omitted.

Rim structures 1A, 1B used in a dual-wheel type vehicle shown in FIG. 8 are also well-known. The rim structure 1A that holds an inner tire Ta closer to the vehicle has similar features to those in FIG. 6. In the rim structure 1B that holds an outer tire Tb farther from the vehicle, opposite end portions of a rim base 10" in the axial direction are provided as gutter band portions 11. A bead seat ring 20, a lock ring 30 and a side ring 40 are mounted on each of the gutter band portions 11.

The gutter band portion 11 and the lock ring 30 of the rim structures 1, 1', 1A, 1B will be described hereinafter particularly referring to FIG. 9. A lock ring groove 15 and a seal ring groove 16 are formed in an outer peripheral surface of the gutter band portion 11. The seal ring groove 16 is disposed inside in the axial direction with respect to the lock ring groove 15. The lock ring groove 15 has a concavely curved cross-sectional contour. A first receiving surface 17 that is a circular cylindrical surface is formed inside in the axial direction with respect to the lock ring groove 15, i.e. between the lock ring groove 15 and the seal ring groove 16. A second receiving surface 18 that is a circular cylindrical surface is formed outside in the axial direction with respect to the lock ring groove 15, i.e. between the lock ring groove 15 and an outer side edge of the gutter band portion 11.

The lock ring 30 is disposed between the gutter band portion 11 of the rim base 10 and the bead seat ring 20 (or the ring member 5). The lock ring 30 has an annular configuration that is cut at one point. A load receiving surface 31 having a tapered annular configuration is formed in an outer periphery of an edge portion of the lock ring 30 located inside in the axial direction.

The lock ring 30 includes an annular ridge 35 at an intermediate position of an inner periphery thereof in the axial direction. The ridge 35 continues in the circumferential direction. The lock ring 30 further includes a first abutment surface 37 that is a circular cylindrical surface located inside in the axial direction with respect to the ridge 35. The lock ring 30 further includes a second abutment surface 38 that is a circular cylindrical surface located outside in the axial direction. The ridge 35 has a convexly curved cross-sectional contour.

In a state where the lock ring 30 is mounted in the gutter band portion 11, the ridge 35 is received in the lock ring groove 15 of the gutter band portion 11. The load receiving surface 31 is surface-contacted with the load applying surface 23 of the bead seat ring 20 (or the ring member 5). The first abutment surface 37 is surface-contacted with the first receiving surface 17 of the gutter band portion 11. The second abutment surface 38 is surface-contacted with the second receiving surface 18.

In the multi-piece rim structures 1, 1', 1A, 1B having the tire mounted thereon, a load in the radial direction is applied to the bead seat ring 20 (or the bead seat ring portion 20' of the ring member 5) from one of the bead portions of the tire. Moreover, a load in the axial direction is applied to the bead seat ring 20 (or the bead seat ring portion 20' of the ring member 5) from the one of the bead portions via the side ring 40 (or the side ring portion 40'). Most of the load in the radial direction and the load in the axial direction applied to the bead seat ring 20 (or the ring member 5) is transmitted to the lock ring 30 via the load applying surface 23 and the load receiving surface 31 and transmitted to the gutter band portion 11 from the lock ring 30.

A load transmission path from the lock ring 30 to the gutter band portion 11 will be described in detail. The load in the radial direction is transmitted via a surface contact region R1 in which the first abutment surface 37 and the first receiving surface 17 are contacted and a surface contact region R2 in which the second abutment surface 38 and the second receiving surface 18 are contacted. The load in the axial direction is transmitted via a surface contact region R3 in which a portion of an outer surface of the ridge 35 of the lock ring 30 located outside in the axial direction and a portion of an inner surface of the lock ring groove 15 located outside in the axial direction are contacted.

In the surface contact regions R1, R2, R3, minute reciprocating sliding may occur between the gutter band portion 11 and the lock ring 30 and repeated load may be applied accompanying the running of the vehicle, which may lead to thinning caused by abrasion. Particularly in the surface contact region R3, it is known that cracks 100 may be generated due to fretting fatigue. If such thinning and cracks are left unattended, parts may come off while running, which may make the vehicle immovable.

Thinning due to corrosion may also occur in the multi-piece rim structures 1, 1', 1A, 1B mentioned above. Specifically, the ridge 35 of the lock ring 30 is received in the lock ring groove 15 of the gutter band portion 11 with play in the radial direction and the axial direction. Since the lock ring 30 receives load outward in the axial direction from the bead portions of the tire, a gap 70 may be formed between an area from a portion of the outer surface of the ridge 35 located inside in the axial direction to a top portion of the outer surface of the ridge 35 and an area from a portion of the inner surface of the lock ring groove 15 located inside in the axial direction to a bottom portion of the inner surface of the lock ring groove 15. Areas of the outer surface of the ridge 35 and the inner surface of the lock ring groove 15 spacedly opposed to each other with the gap 70 interposed therebetween is indicated by reference numeral R0. It should be noted that the lock ring 30 is temporarily moved inward in the axial direction when the lock ring 30 is removed or attached for exchanging tire or when air pressure of the tire is reduced or when the air pressure is increased, and the gap 70 disappears in the region R0. In this condition, the ridge 35 of the lock ring 30 is surface contacted with the portion of the inner surface of the lock ring groove 15 located inside in the axial direction.

Water may pool in the gap 70 if water enters the lock ring groove 15 from a cut portion of the lock ring 30 or if moisture existing in the gap 70 condensates. Therefore, the regions R0, R1, R2, R3 may be corroding environment, in which corrosion thinning may easily occur in the surface contact regions R1, R3.

Particularly, in the surface contact region R3, the fretting fatigue may be accelerated by corrosion and abrasion because stress concentration is significant in this region. Therefore, growth of the cracks 100 may be accelerated in this region.

To cope with this problem, as disclosed in Patent Document 1 to be described later, the applicant suggests providing fretting resistance and corrosion resistance to the multi-piece rim structure by forming painted film layers of normal temperature drying paint on the inner surface of the lock ring groove of the gutter band portion and the first and second receiving surfaces adjacent to the lock ring groove and forming coated layers of normal temperature drying lubricant on the painted film layers.

As disclosed in Patent Document 2 to be described later, the applicant also suggests forming hardened layers on the inner surface of the lock ring groove of the gutter band portion and the first and second receiving surfaces by ion nitriding treatment.

PRIOR ART DOCUMENTS

Patent Documents

Patent Document 1: Japanese Unexamined Patent Application Publication No. H10-24701
Patent Document 2: Japanese Unexamined Patent Application Publication No. 2001-225604

SUMMARY OF THE INVENTION

Problem to be Solved by the Invention

As shown in Patent Document 1, when a painted film layer is formed in a gutter band portion, the painted film layer may come off due to friction in surface contact regions R1, R2, R3, which may accelerate corrosion in the surface contact regions R1, R2, R3. Particularly in the surface contact region R3 where stress concentration is significant, fretting fatigue is accelerated accompanying the corrosion. In the surface contact region R0, a lock ring 30 and a gutter band 11 are contacted when air pressure of tire is reduced, and the painted film layer may be damaged at that time.

The hardened layer of Patent Document 2 may enhance fretting resistance, but may not prevent corrosion. Therefore, it may be difficult to suppress fretting fatigue particularly in the surface contact region R3 for a long period of time.

Means for Solving the Problem

To solve the problems mentioned above, the present invention provides a multi-piece rim structure for a wheel including: a rim base including an annular lock ring groove in an outer periphery of an end portion thereof in an axial direction; a ring member disposed in an outside of the rim base in a radial direction, the ring member receiving a load from a bead portion of a tire in the radial direction and the axial direction; and a lock ring including an annular ridge in an inner periphery thereof, the ridge being able to be received in the lock ring groove, thereby the lock ring being attached to the rim base, the lock ring catching the ring member and receiving a load from the ring member in the radial direction and the axial direction, wherein: at least one of surfaces of the rim base and the lock ring opposed to each other has a sacrificial anticorrosion material disposed therein, the sacrificial anticorrosion material including a metal having a greater ionization tendency than a base material of the rim base and the lock ring.

According to the features mentioned above, ionization and corrosion as a result of ionization may occur in the metal of the sacrificial anticorrosion material having the greater ionization tendency. Therefore, ionization of the base material of the rim base and the lock ring can be suppressed, and thereby, the corrosion of the base material can be suppressed. Particularly, acceleration of fretting fatigue by corrosion can be avoided, and fretting resistance can be enhanced in a portion of an inner surface of the lock ring groove located outside in the axial direction. As a result, life of the rim structure may be extended.

Preferably, at least one of the surfaces of the rim base and the lock ring opposed to each other has a receiving groove extending in a circumferential direction formed therein; and the sacrificial anticorrosion material is disposed in the receiving groove.

According to the features mentioned above, even when a vehicle is moving or air pressure of the tire is being reduced, the sacrificial anticorrosion material in the receiving groove may not be affected by the lock ring, and the sacrificial anticorrosion material can be preserved for a long period of time.

Preferably, the receiving groove is formed in a portion of an inner surface of the lock ring groove located inside in the axial direction or in a bottom portion of the inner surface of the lock ring groove.

According to the features mentioned above, the sacrificial anticorrosion material can be exposed to a gap between the inner surface of the lock ring groove and an outer surface of the lock ring that tends to pool water. As a result, ionization of the sacrificial anticorrosion material may be promoted, and thereby, corrosion of a surface contact region between the lock ring and the rim base can be surely suppressed.

Preferably, the receiving groove is formed in a portion of an outer surface of the ridge of the lock ring located inside in the axial direction or in a top portion of the outer surface of the ridge of the lock ring.

According to the features mentioned above, the sacrificial anticorrosion material can be exposed to the gap between the inner surface of the lock ring groove and the outer surface of the lock ring that tends to pool water. Thereby, corrosion of the surface contact region between the lock ring and the rim base can be surely suppressed.

In another embodiment of the present invention, a play in the axial direction is provided between the lock ring groove and the ridge of the lock ring; a portion of an inner surface of the lock ring groove located inside in the axial direction and a portion of an outer surface of the ridge of the lock ring located inside in the axial direction are spaced from each other even when the lock ring is located inside in the axial direction to a maximum extent; and at least one of the portion of the inner surface of the lock ring groove located inside in the axial direction and the portion of the outer surface of the ridge of the lock ring located inside in the axial direction has the sacrificial anticorrosion material disposed therein.

According to the features mentioned above, detachment of the sacrificial anticorrosion material caused by swinging of the lock ring in the axial direction while the vehicle is moving or a movement of the lock ring inward in the axial direction while the air pressure of tire is being reduced can be suppressed without forming the receiving groove. Moreover, the sacrificial anticorrosion material can be exposed to the gap between the inner surface of the lock ring groove and the outer surface of the ridge of the lock ring that tends to pool water. Thereby, corrosion of the surface contact region between the lock ring and the rim base can be surely suppressed. This feature is attained by a mismatch between a configuration of the outer surface of the ridge of the lock ring and a configuration of the inner surface of the lock ring groove.

In another embodiment of the present invention, a bottom portion of an inner surface of the lock ring groove and a top portion of an outer surface of the ridge of the lock ring are spaced from each other; and at least one of the bottom portion of the inner surface of the lock ring groove and the top portion of the outer surface of the ridge of the lock ring has the sacrificial anticorrosion material disposed therein.

According to the features mentioned above, the detachment of the sacrificial anticorrosion material caused by the swinging of the lock ring in the axial direction while the vehicle is moving or the movement of the lock ring inward in the axial direction while the air pressure of the tire is being reduced can be suppressed without forming the receiving groove. Moreover, the sacrificial anticorrosion material can be exposed to the gap between the inner surface of the lock ring groove and the outer surface of the ridge of the lock ring that tends to pool water. Thereby, the corrosion of the surface contact region between the lock ring and the rim base can be surely suppressed.

More specifically, the base material of the rim base and the lock ring includes iron; and the sacrificial anticorrosion material includes zinc, aluminum, or an alloy of zinc and aluminum as the metal having the greater ionization tendency than the iron. The sacrificial anticorrosion material may include the said metal that is thermal sprayed or plated. The sacrificial anticorrosion material may include a mixture of a resin and the said metal that is applied.

Advantageous Effects of the Invention

According to the present invention, corrosion can be suppressed, and fretting resistance can be enhanced in a multi-piece rim structure of a wheel.

MODE FOR CARRYING OUT THE INVENTION

Figure 6:
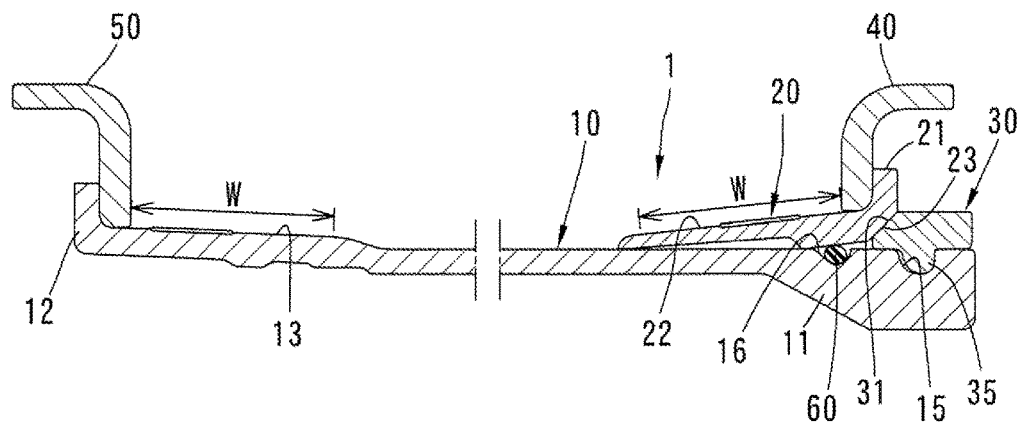
FIG. 6 is a schematic cross-sectional view of a well-known multi-piece rim structure composed of five pieces.
Figure 7:
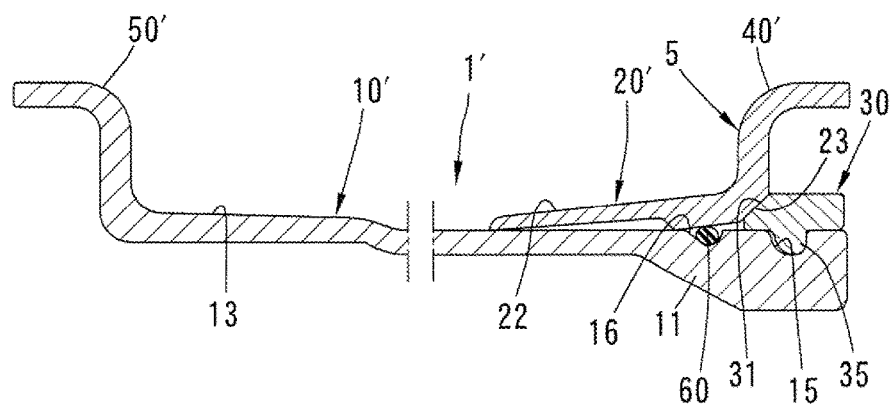
FIG. 7 is a schematic cross-sectional view of a well-known multi-piece rim structure composed of three pieces.
Figure 8:
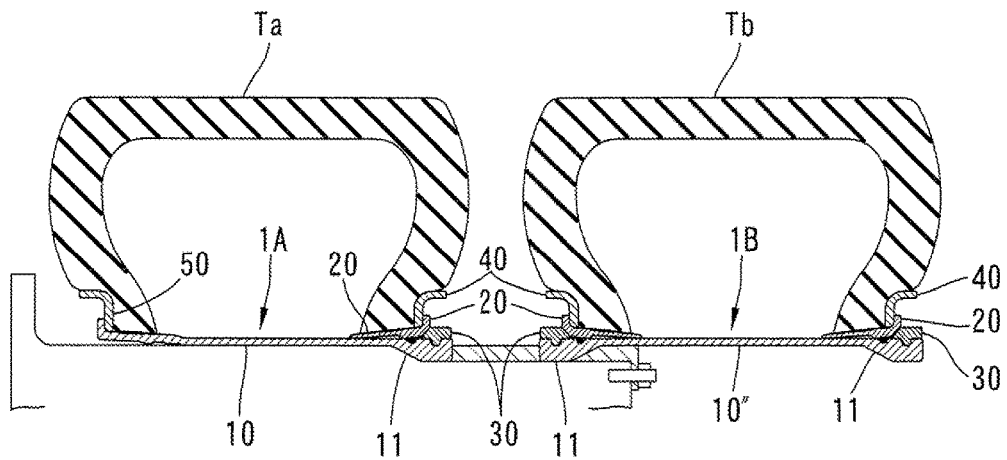
FIG. 8 is a schematic cross-sectional view of a well-known multi-piece rim structure mounted in a dual-wheel type vehicle.
Figure 9:
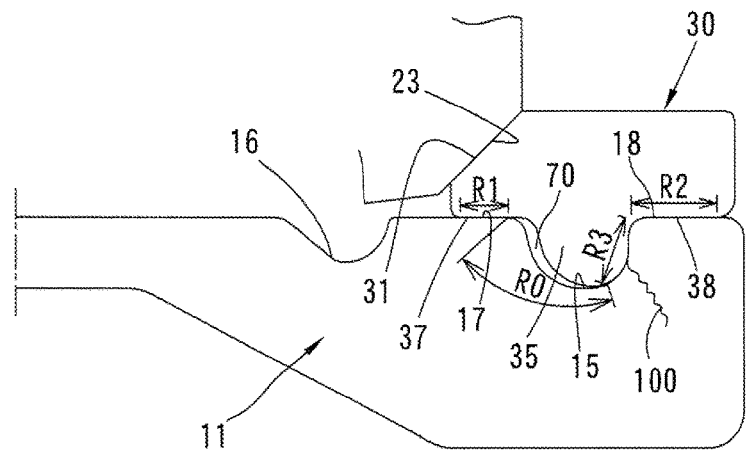
FIG. 9 is an enlarged cross-sectional view of a main portion of a well-known multi-piece rim structure.

Embodiments of the present invention will be described hereinafter with reference to FIGS. 1 to 5. Basic features of a multi-piece rim structure according to the present invention are similar to those of the rim structures 1, 1', 1A, 1B shown in FIGS. 6 to 8, and therefore, detailed descriptions thereof will be omitted. A major portion only of the multi-piece rim structure will be described below.

Figure 1A:
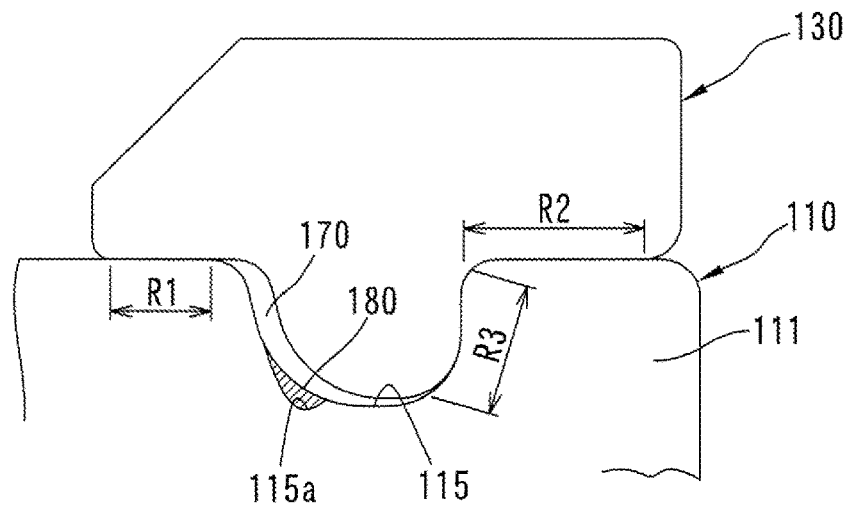
FIG. 1A is an enlarged cross-sectional view of a main portion of a multi-piece rim structure according to the present invention, showing an embodiment in which a sacrificial anticorrosion material is disposed in a receiving groove formed in an inner surface of a lock ring groove of a gutter band portion.

In the embodiment shown in FIG. 1A, an annular receiving groove 115a is formed in an inner surface of a lock ring groove 115 of a gutter band portion 111. The receiving groove 115a extends in the circumferential direction in a lower portion of the inner surface of the lock ring groove 115 located inside in the axial direction. A sacrificial anticorrosion material 180 is embedded in the receiving groove 115a by thermal spraying. The sacrificial anticorrosion material 180 is made of zinc or aluminum or an alloy of 50 weight percent of zinc and 50 weight percent of aluminum that have greater ionization tendency than iron that is a base material of a rim base 110 and a lock ring 130. Preferably, the receiving groove 115a is formed by rolling a strip steel corresponding to the gutter band portion 111 and then trimming the rolled strip steel.

According to the features mentioned above, the sacrificial anticorrosion material 180 that may be contacted with water pooled in a gap 170 may be ionized and oxidized, and thereby, ionization of iron that is the base material of the rim base 110 and the lock ring 130 may be suppressed. As a result, corrosion thinning particularly of surface contact regions R1, R3 adjacent to the gap 170 can be suppressed. Moreover, in the surface contact region R3, promotion of fretting fatigue by corrosion can be avoided, and breakages by cracking can be avoided for a long period of time.

While a vehicle is moving, the lock ring 130 may be swung greatly in the axial direction and may come close to a portion of the inner surface of the lock ring groove 115 located inside in the axial direction. The lock ring 130 may be moved inward in the axial direction when the air pressure of the tire is reduced. However, breakages of the sacrificial anticorrosion material 180 by the lock ring 130 can be avoided since the sacrificial anticorrosion material 180 is received in the receiving groove 115a.

Figure 1B:
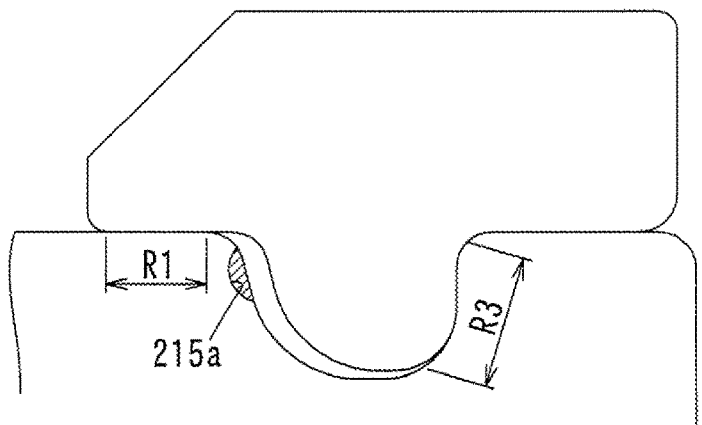
FIG. 1B is a view corresponding to FIG. 1A, in which a position of the sacrificial anticorrosion material is changed.

In an embodiment shown in FIG. 1B, a receiving groove 215a is formed near a first receiving surface, more spaced from a bottom portion than in FIG. 1A. Since other features are similar to those shown in FIG. 1A, description thereof will be omitted.

Figure 1C:
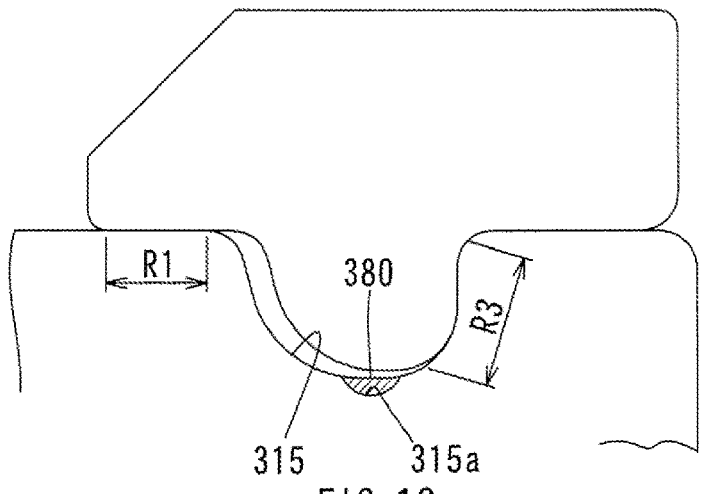
FIG. 1C is a view corresponding to FIG. 1A, in which the position of the sacrificial anticorrosion material is changed.

In an embodiment shown in FIG. 1C, a receiving groove 315a is formed in a bottom portion of an inner surface of a lock ring groove 315. A sacrificial anticorrosion material 380 is embedded in the receiving groove 315a. Since other features are similar to those shown in FIG. 1A, description thereof will be omitted.

Figure 2A:
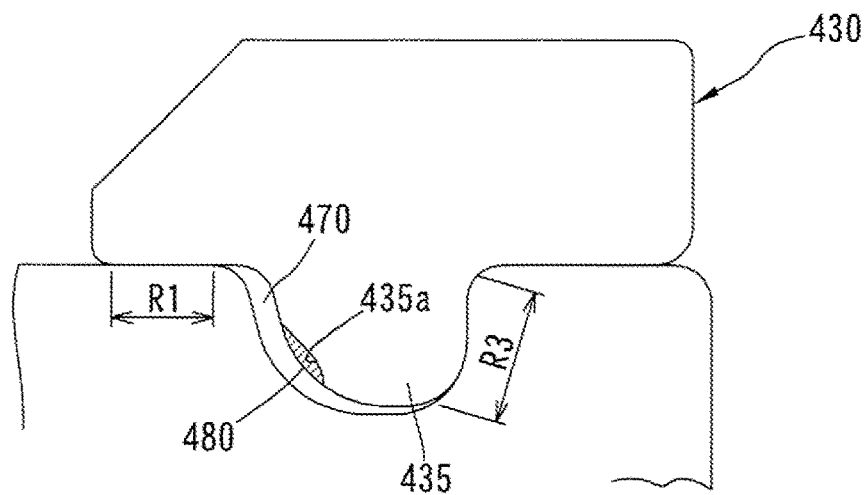
FIG. 2A is an enlarged cross-sectional view of a main portion of the multi-piece rim structure according to the present invention, showing another embodiment in which a sacrificial anticorrosion material is disposed in a receiving groove formed in an outer surface of a ridge of a lock ring.

In an embodiment shown in FIG. 2A, a receiving groove 435a is formed in a surface region of an outer surface of a ridge 435 of a lock ring 430 located inside in the axial direction. A sacrificial anticorrosion material 480 is embedded in the receiving groove 435a. The sacrificial anticorrosion material 480 is facing a gap 470.

Figure 2B:
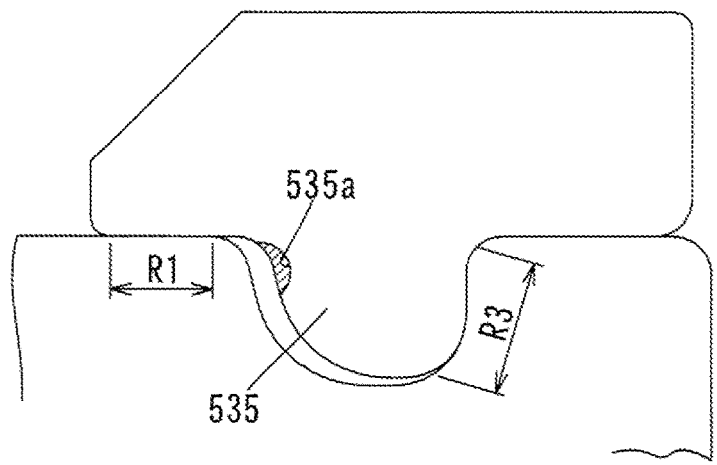
FIG. 2B is a view corresponding to FIG. 2A, in which a position of the sacrificial anticorrosion material is changed.

In an embodiment shown in FIG. 2B, a receiving groove 535a is formed in a skirt portion of a ridge 535, more spaced from a top portion of the ridge 535 than in FIG. 2A. Since other features are similar to those shown in FIG. 2A, description thereof will be omitted.

Figure 2C:
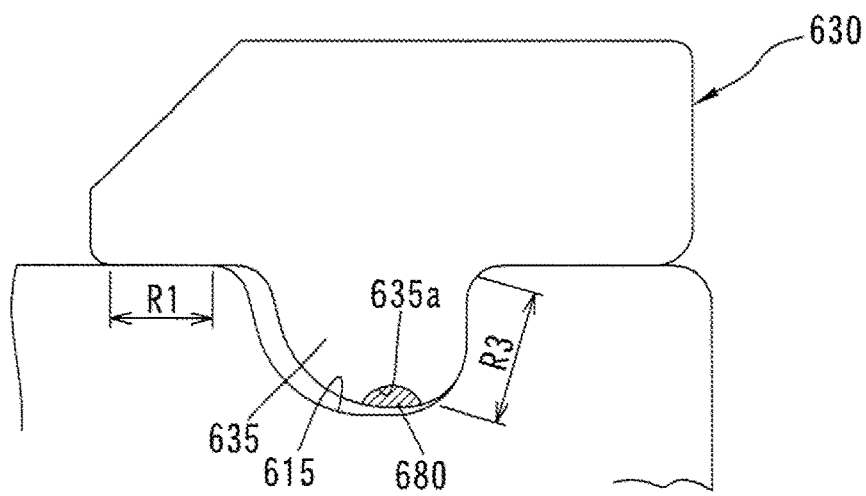
FIG. 2C is a view corresponding to FIG. 2A, in which the position of the sacrificial anticorrosion material is changed.

In an embodiment shown in FIG. 2C, a receiving groove 635a is formed in a top portion (portion opposed to a bottom portion of an inner surface of a lock ring groove 615) of an outer surface of a ridge 635 of a lock ring 630. A sacrificial anticorrosion material 680 is embedded in the receiving groove 635a. Since other features are similar to those shown in FIG. 2A, description thereof will be omitted.

Figure 3A:
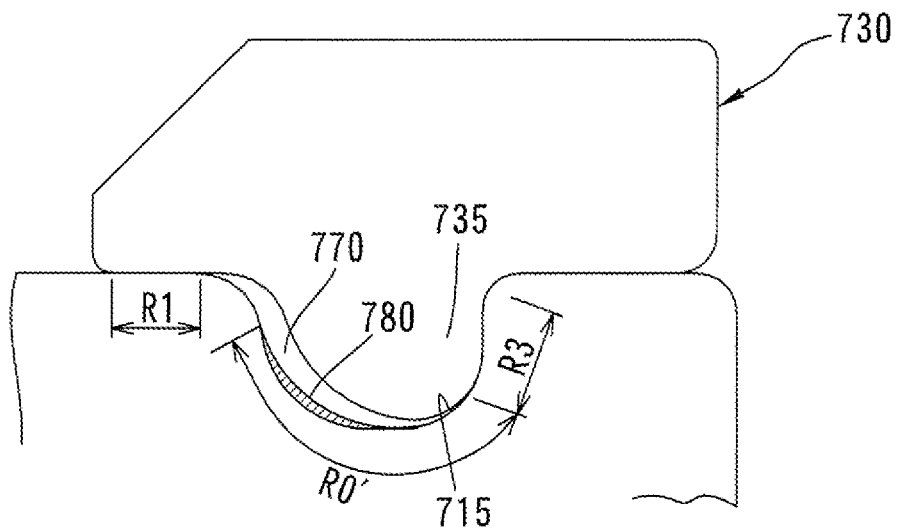
FIG. 3A is an enlarged cross-sectional view of a main portion of another embodiment of the present invention in which a sacrificial anticorrosion material is disposed in an inner surface of a lock ring groove without forming a receiving groove, showing a normal state in which a lock ring is moved outward in the axial direction to a maximum extent.
Figure 3B:
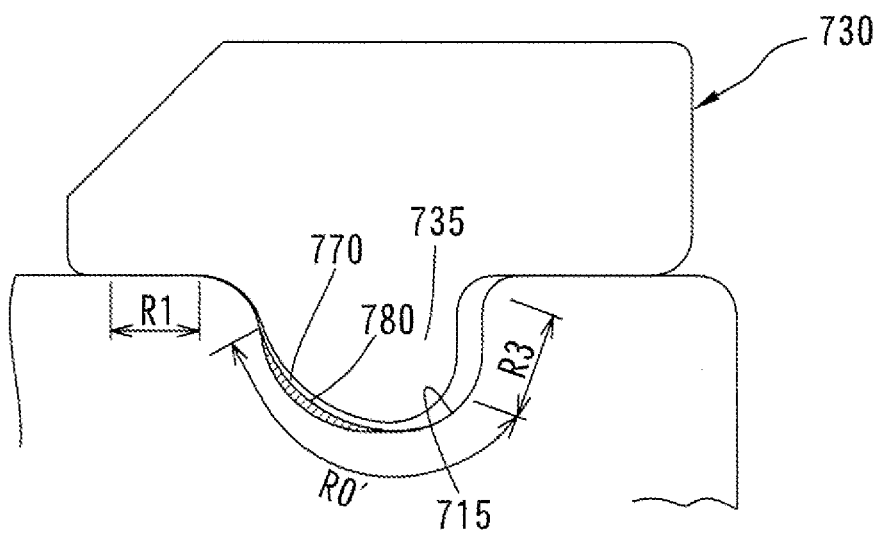
FIG. 3B is a view showing the embodiment of FIG. 3A in a state in which the lock ring is moved inward in the axial direction to a maximum extent when the air pressure of a tire is reduced.

In an embodiment shown in FIGS. 3A and 3B, a receiving groove is not formed in an inner surface of a lock ring groove 715. A surface shape of a portion of the inner surface of the lock ring groove 715 located outside in the axial direction and a surface shape of a portion of an outer surface of a ridge 735 of a lock ring 730 located outside in the axial direction coincide with each other, and thereby a contact region R3 is secured. However, a surface shape of a portion of the inner surface of the lock ring groove 715 located inside in the axial direction and a portion of the outer surface of the ridge 735 located inside in the axial direction do not coincide with each other.

As shown in FIG. 3A, the lock ring 730 is located outside in the axial direction in a normal state. When an air pressure is reduced in tire, the lock ring 730 may be moved inward in the axial direction as shown in FIG. 3B. However, even if the lock ring 730 is moved inward in the axial direction to a maximum extent, the portion of the inner surface of the lock ring groove 715 located inside in the axial direction and the portion of the outer surface of the ridge 735 of the lock ring 730 located inside in the axial direction are spaced from each other and a bottom portion of the inner surface of the lock ring groove 715 and a top portion of an outer surface of the lock ring 730 are spaced from each other. A surface region at which the inner surface of the lock ring groove 715 and the outer surface of the ridge 735 of the lock ring 730 are opposed to each other constantly spaced from each other is referred to by reference numeral R0'.

A sacrificial anticorrosion material 780 is disposed in the inner surface of the lock ring groove 715 at the surface region R0' by thermal spraying. The sacrificial anticorrosion material 780 fills a part or an entirety of a gap between the inner surface of the lock ring groove 715 and the outer surface of the ridge 735 of the lock ring 730 in a state shown in FIG. 3B. The sacrificial anticorrosion material 780 is facing the gap 770.

In the embodiment shown in FIGS. 3A and 3B, the sacrificial anticorrosion material 780 may be disposed only in the portion of the inner surface of the lock ring groove 715 located inside in the axial direction or only in the bottom portion of the inner surface of the lock ring groove 715.

Figure 4A:
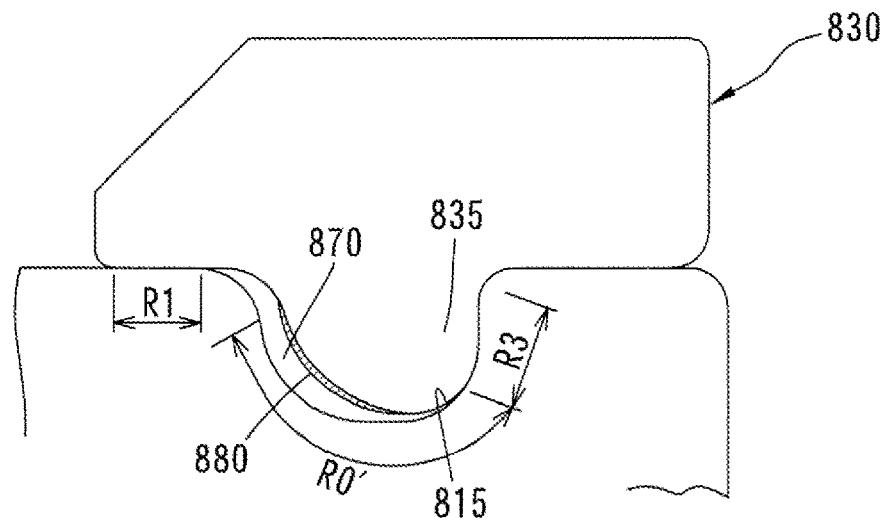
FIG. 4A is an enlarged cross-sectional view of a main portion of another embodiment of the present invention in which a sacrificial anticorrosion material is disposed in an outer surface of a ridge of a lock ring without forming a receiving groove, showing a normal state in which the lock ring is moved outward in the axial direction to a maximum extent.
Figure 4B:
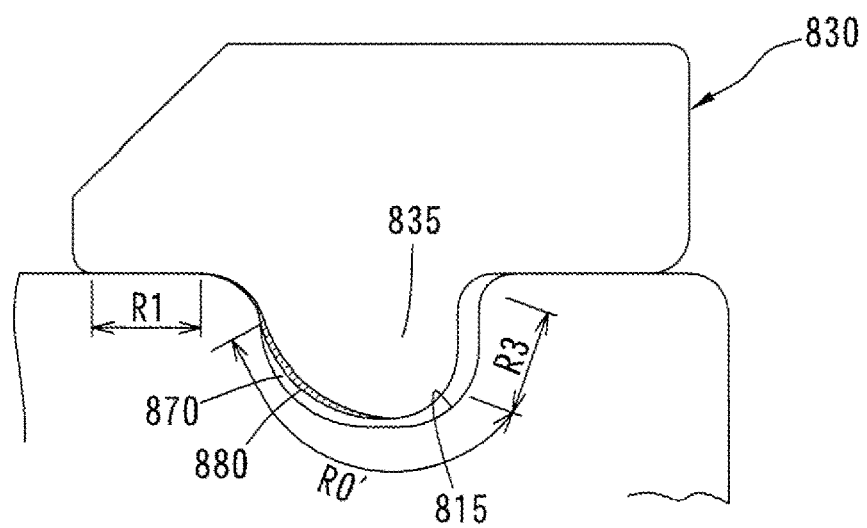
FIG. 4B is a view showing the embodiment of FIG. 4A in a state in which the lock ring is moved inward in the axial direction to a maximum extent when the air pressure of the tire is reduced.

In an embodiment shown in FIGS. 4A and 4B, configurations of a lock ring groove 815 and a ridge 835 of a lock ring 830 are same as those in the embodiment shown in FIGS. 3A and 3B. In this embodiment, a sacrificial anticorrosion material 880 is disposed in an outer surface of the ridge 835 at the surface region R0'. The sacrificial anticorrosion material 880 fills a part or an entirety of a gap between an inner surface of the lock ring groove 815 and an outer surface of the ridge 835 of the lock ring 830 in a state shown in FIG. 4B. The sacrificial anticorrosion material 880 is facing a gap 870.

In the embodiment shown in FIGS. 4A and 4B, the sacrificial anticorrosion material 880 may be disposed only in a portion of the outer surface of the ridge 835 located inside in the axial direction or only in a top portion of the outer surface of the ridge 835.

In the embodiments shown in FIGS. 1 to 4, the sacrificial anticorrosion material may be disposed in an entirety of the inner surface of the lock ring groove or in an entirety of the outer surface of the ridge. The movement of the lock ring inward in the axial direction during the reduction of the air pressure of the tire may cause a part of the sacrificial anticorrosion material to be detached. However, the remaining portion of the sacrificial anticorrosion material may be unaffected.

Figure 5A:
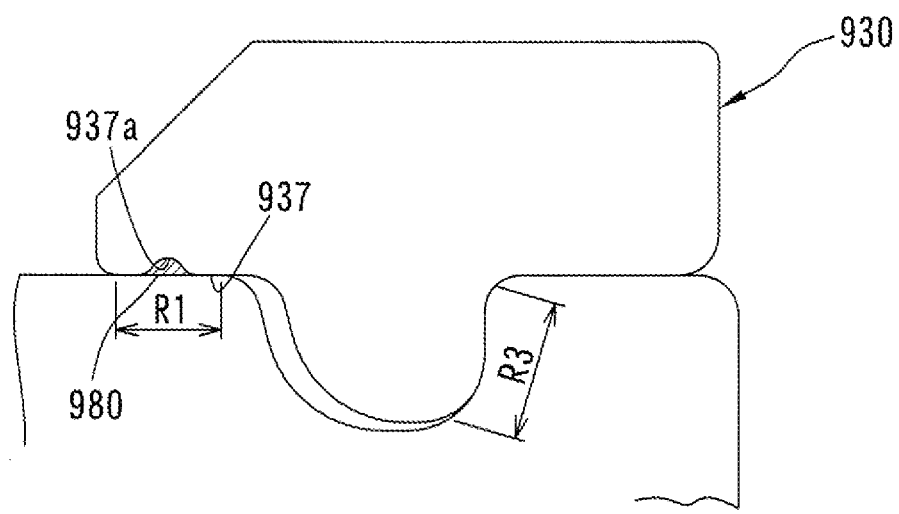
FIG. 5A is an enlarged cross-sectional view of a main portion of another embodiment of the present invention in which a sacrificial anticorrosion material is disposed in an abutment surface of a lock ring adjacent to a ridge.

In FIG. 5A, a receiving groove 937a is formed in a first abutment surface 937 of a lock ring 930, and a sacrificial anticorrosion material 980 is embedded in the receiving groove 937a.

Figure 5B:
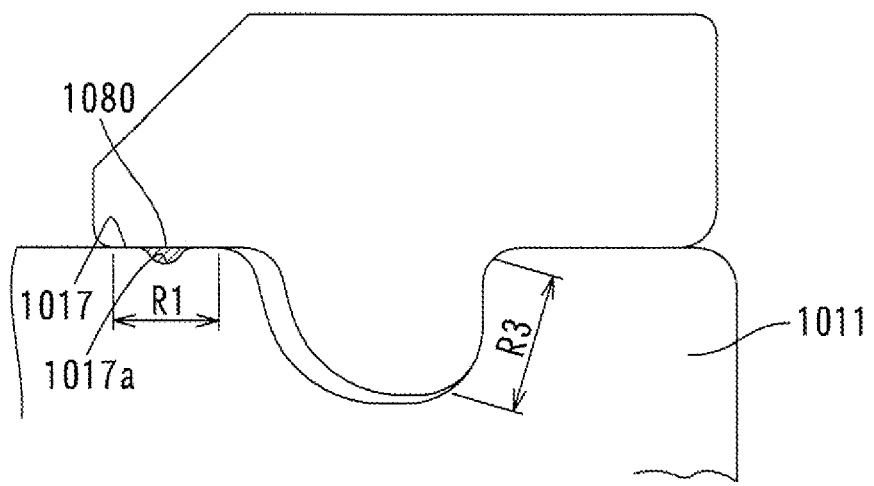
FIG. 5B is an enlarged cross-sectional view of a main portion of another embodiment of the present invention in which a sacrificial anticorrosion material is disposed in a receiving surface of a gutter band portion adjacent to a lock ring groove.

In FIG. 5B, a receiving groove 1017a is formed in a first receiving surface 1017 of a gutter band portion 1011, and a sacrificial anticorrosion material 1080 is embedded in the receiving groove 1017a.

The present invention is not limited to the embodiments described above, and various modifications can be adopted.

The sacrificial anticorrosion material may be made by plating.

The sacrificial anticorrosion material may be formed as a stick, a wire, a band or the like made of zinc, aluminum, or an alloy of zinc and aluminum, and embedded in the receiving groove.

The sacrificial anticorrosion material may take a form of the metal mentioned above contained in a resin, which may be applied into the receiving groove or painted on the inner surface of the lock ring groove or the outer surface of the ridge of the lock ring. This sacrificial anticorrosion material contained in the resin can be easily applied to the multi-piece rim structure when the tire is exchanged or attached or detached for maintenance.

In addition to the sacrificial anticorrosion material, a hardened layer may be formed on the inner surface of the lock ring groove by high-frequency hardening, ion nitriding, or the like.

INDUSTRIAL APPLICABILITY

The present invention may be applied to a multi-piece rim structure for a wheel of a large vehicle.

The invention claimed is:

1. A multi-piece rim structure for a wheel comprising:
   a rim base comprising an annular lock ring groove in an outer periphery of an end portion thereof in an axial direction;
   a ring member disposed in an outside of the rim base in a radial direction, the ring member receiving a load from a bead portion of a tire in the radial direction and the axial direction; and
   a lock ring comprising an annular ridge in an inner periphery thereof, the ridge being able to be received in the lock ring groove, thereby the lock ring being attached to the rim base, the lock ring catching the ring member and receiving a load from the ring member in the radial direction and the axial direction,
   wherein at least one of surfaces of the rim base and the lock ring opposed to each other has a sacrificial anticorrosion material disposed therein, the sacrificial anticorrosion material comprising a metal having a greater ionization tendency than a base material of the rim base and the lock ring.

2. The multi-piece rim structure for the wheel according to claim 1, wherein: at least one of the surfaces of the rim base and the lock ring opposed to each other has a receiving groove extending in a circumferential direction formed therein; and
   the sacrificial anticorrosion material is disposed in the receiving groove.

3. The multi-piece rim structure for the wheel according to claim 2, wherein the receiving groove is formed in a portion of an inner surface of the lock ring groove located inside in the axial direction or in a bottom portion of the inner surface of the lock ring groove.

4. The multi-piece rim structure for the wheel according to claim 2, wherein the receiving groove is formed in a portion of an outer surface of the ridge of the lock ring located inside in the axial direction or in a top portion of the outer surface of the ridge of the lock ring.

5. The multi-piece rim structure for the wheel according to claim 1, wherein: a play in the axial direction is provided between the lock ring groove and the ridge of the lock ring;
   a portion of an inner surface of the lock ring groove located inside in the axial direction and a portion of an outer surface of the ridge of the lock ring located inside in the axial direction are spaced from each other even when the lock ring is located inside in the axial direction to a maximum extent; and
   at least one of the portion of the inner surface of the lock ring groove located inside in the axial direction and the portion of the outer surface of the ridge of the lock ring located inside in the axial direction has the sacrificial anticorrosion material disposed therein.

6. The multi-piece rim structure for the wheel according to claim 1, wherein: a bottom portion of an inner surface of the lock ring groove and a top portion of an outer surface of the ridge of the lock ring are spaced from each other; and
   at least one of the bottom portion of the inner surface of the lock ring groove and the top portion of the outer surface of the ridge of the lock ring has the sacrificial anticorrosion material disposed therein.

7. The multi-piece rim structure for the wheel according to claim 1, wherein: the base material of the rim base and the lock ring comprises iron; and
   the sacrificial anticorrosion material comprises zinc, aluminum, or an alloy of zinc and aluminum as the metal having the greater ionization tendency than the iron.

8. The multi-piece rim structure for the wheel according to claim 1, wherein the sacrificial anticorrosion material comprises the said metal that is thermal sprayed or plated.

9. The multi-piece rim structure for the wheel according to claim 1, wherein the sacrificial anticorrosion material comprises a mixture of a resin and the said metal that is applied.

10. The multi-piece rim structure for the wheel according to claim 1, wherein the sacrificial anticorrosion material is disposed in an entirety of an inner surface of the lock ring groove of the rim base.

11. The multi-piece rim structure for the wheel according to claim 1, wherein the sacrificial anticorrosion material is disposed in an entirety of an outer surface of the ridge of the lock ring.

12. A rim base of a multi-piece rim structure for a wheel comprising a gutter band portion disposed in one end portion thereof in an axial direction, a lock ring groove formed in an outer periphery of the gutter band portion, the lock ring groove adopted to receive an annular ridge of a lock ring,
wherein a sacrificial anticorrosion material is disposed in an inner surface of the lock ring groove, the sacrificial anticorrosion material comprising a metal having a greater ionization tendency than a base material of the rim base and the lock ring.

13. The rim base according to claim 12, wherein the sacrificial anticorrosion material is disposed in an entirety of the inner surface of the lock ring groove.

14. A lock ring of a multi-piece rim structure for a wheel comprising an annular ridge adopted to be received in a lock ring groove formed in an outer periphery of a gutter band portion, the gutter band portion disposed in one end portion of a rim base in an axial direction,
wherein a sacrificial anticorrosion material is disposed in an outer surface of the ridge, the sacrificial anticorrosion material comprising a metal having a greater ionization tendency than a base material of the rim base and the lock ring.

15. The lock ring according to claim 14, wherein the sacrificial anticorrosion material is disposed in an entirety of the outer surface of the ridge.

* * * * *